(12) United States Patent
Albertson et al.

(10) Patent No.: US 7,523,734 B2
(45) Date of Patent: Apr. 28, 2009

(54) SYSTEM TO REDUCE CRANKSHAFT SPEED VARIATIONS

(75) Inventors: William C. Albertson, Clinton Township, MI (US); Mike M. McDonald, Macomb, MI (US)

(73) Assignee: GM Global Technology Operations, Inc., Detroit, MI (US)

( * ) Notice: Subject to any disclaimer, the term of this patent is extended or adjusted under 35 U.S.C. 154(b) by 0 days.

(21) Appl. No.: 11/434,380

(22) Filed: May 15, 2006

(65) Prior Publication Data

US 2007/0261656 A1 Nov. 15, 2007

(51) Int. Cl.
*F02B 75/06* (2006.01)
*F02D 17/02* (2006.01)

(52) U.S. Cl. .................. 123/192.1; 123/198 F

(58) Field of Classification Search .......... 123/192.1, 123/192.2, 198 F, 481, 436; 701/111
See application file for complete search history.

(56) References Cited

U.S. PATENT DOCUMENTS

| | | | | |
|---|---|---|---|---|
| 5,606,946 A | * | 3/1997 | Data et al. ............... | 123/198 F |
| 6,148,784 A | * | 11/2000 | Masberg et al. .......... | 123/192.1 |
| 6,254,507 B1 | | 7/2001 | Downs | |
| 6,382,163 B1 | * | 5/2002 | Murray et al. ........... | 123/192.1 |
| 6,516,770 B1 | * | 2/2003 | Berger et al. ............. | 123/192.1 |
| 6,695,111 B1 | | 2/2004 | Bai | |
| 6,998,823 B2 | * | 2/2006 | Albertson .................... | 322/38 |
| 2003/0034002 A1 | * | 2/2003 | Armstrong et al. ........ | 123/192.1 |
| 2005/0029991 A1 | * | 2/2005 | Albertson ................... | 322/29 |
| 2005/0164828 A1 | * | 7/2005 | Polom et al. ................ | 477/3 |
| 2005/0257778 A1 | * | 11/2005 | Albertson et al. ........... | 123/481 |
| 2006/0254555 A1 | * | 11/2006 | Berger et al. ............. | 123/192.1 |

FOREIGN PATENT DOCUMENTS

WO WO 03/004845 A1 * 1/2003

* cited by examiner

*Primary Examiner*—Noah Kamen
*Assistant Examiner*—Ka Chun Leung

(57) ABSTRACT

A system to reduce rotational speed variations of a crankshaft includes a controller, a braking device, and a control module. The controller deactivates at least one cylinder in an internal combustion engine. The braking device applies a braking torque to the crankshaft when at least one cylinder is deactivated. The control module determines whether the controller has deactivated at least one cylinder and selectively synchronizes the braking torque with a crankshaft rotational speed.

16 Claims, 6 Drawing Sheets

SYSTEM TO REDUCE CRANKSHAFT SPEED VARIATIONS

FIELD OF THE INVENTION

The present invention relates to internal combustion engines, and more particularly to reducing speed variations of a crankshaft associated with an internal combustion engine.

BACKGROUND OF THE INVENTION

In a vehicle with an automatic transmission, a crankshaft is typically connected to the transmission using a torque converter. The torque converter includes a pump and a turbine. The pump is connected to the crankshaft and rotates at the same speed as the crankshaft. The turbine is connected to the transmission and rotates at the same speed as the transmission. The torque converter allows the crankshaft to spin somewhat independently from the transmission. If the engine is rotating slowly, the amount of torque transferred by the torque converter is low, which allows the vehicle to come to a stop while the engine continues to rotate. At steady vehicle speeds, the transmission and crankshaft operate at nearly the same speed, which transfers torque from the crankshaft to the transmission more efficiently. Some torque converters have control systems that regulate the amount of slip between the turbine and the pump when the vehicle reaches a desired speed to reduce slip and to increase fuel efficiency.

When the engine rotates, the crankshaft rotational speed may vary periodically as shown by a solid line 6 in FIG. 1. Crankshaft speed variation may be particularly high when the engine has a small number of cylinders. In addition, the rotational speed of the turbine is also likely to vary sporadically as shown by a dotted 8 line in FIG. 1. Variations in rotational speed may cause the crankshaft and turbine to periodically rotate at the same speed causing a converter clutch to periodically lock and unlock the pump and turbine together. Periodically locking and unlocking the converter clutch may damage to the clutch. Periodically locking and unlocking may also cause unacceptable levels of noise and vibration.

SUMMARY OF THE INVENTION

A system to reduce rotational speed variations of a crankshaft according to the present invention includes a controller, a braking device, and a control module. The controller deactivates at least one cylinder in an internal combustion engine. The braking device applies regulates a braking torque to the crankshaft when at least one cylinder is deactivated. The control module determines whether the controller has deactivated at least one cylinder and selectively synchronizes the braking torque with a crankshaft rotational speed.

In other features, the braking device increases a braking torque when the crankshaft rotational speed is increasing. The braking device decreases the braking torque when the crankshaft rotational speed is decreasing. The control module determines whether the crankshaft rotational speed is increasing or decreasing based on a crankshaft position. The control module may also determine whether the crankshaft rotational speed is increasing or decreasing based on an engine speed. In addition, the control module may determine whether the crankshaft rotational speed is increasing or decreasing based on an intake manifold pressure.

In yet other features, the braking device is an electric machine having a rotor. The control module selectively synchronizes a rotor rotational torque load with the crankshaft rotational speed. The control module increases a rotor torque load by increasing the current through the rotor when the crankshaft rotational speed is increasing. The control module decreases the rotor torque load by decreasing the current in the rotor when the crankshaft rotational speed is decreasing.

Further areas of applicability of the present invention will become apparent from the detailed description provided hereinafter. It should be understood that the detailed description and specific examples, while indicating the preferred embodiment of the invention, are intended for purposes of illustration only and are not intended to limit the scope of the invention.

BRIEF DESCRIPTION OF THE DRAWINGS

The present invention will become more fully understood from the detailed description and the accompanying drawings, wherein.

DETAILED DESCRIPTION OF THE PREFERRED EMBODIMENTS

Figure 1:
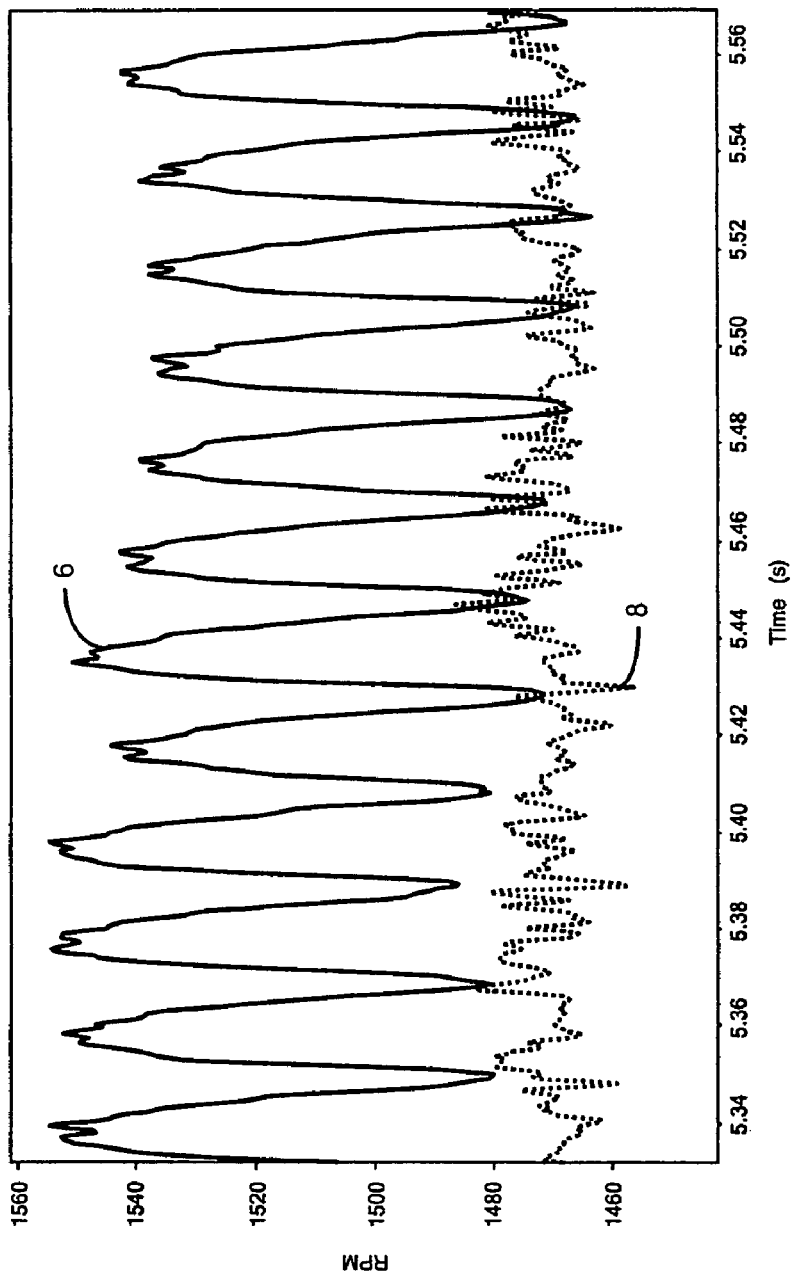
FIG. 1 is a graphical illustration of crankshaft and turbine rotational speed versus time according to the prior art.

The following description of the preferred embodiment(s) is merely exemplary in nature and is in no way intended to limit the invention, its application, or uses. For purposes of clarity, the same reference numbers will be used in the drawings to identify similar elements. As used herein, the term module refers to an application specific integrated circuit (ASIC), an electronic circuit, a processor (shared, dedicated, or group) and memory that execute one or more software or firmware programs, a combinational logic circuit, and/or other suitable components that provide the described functionality.

Figure 2:
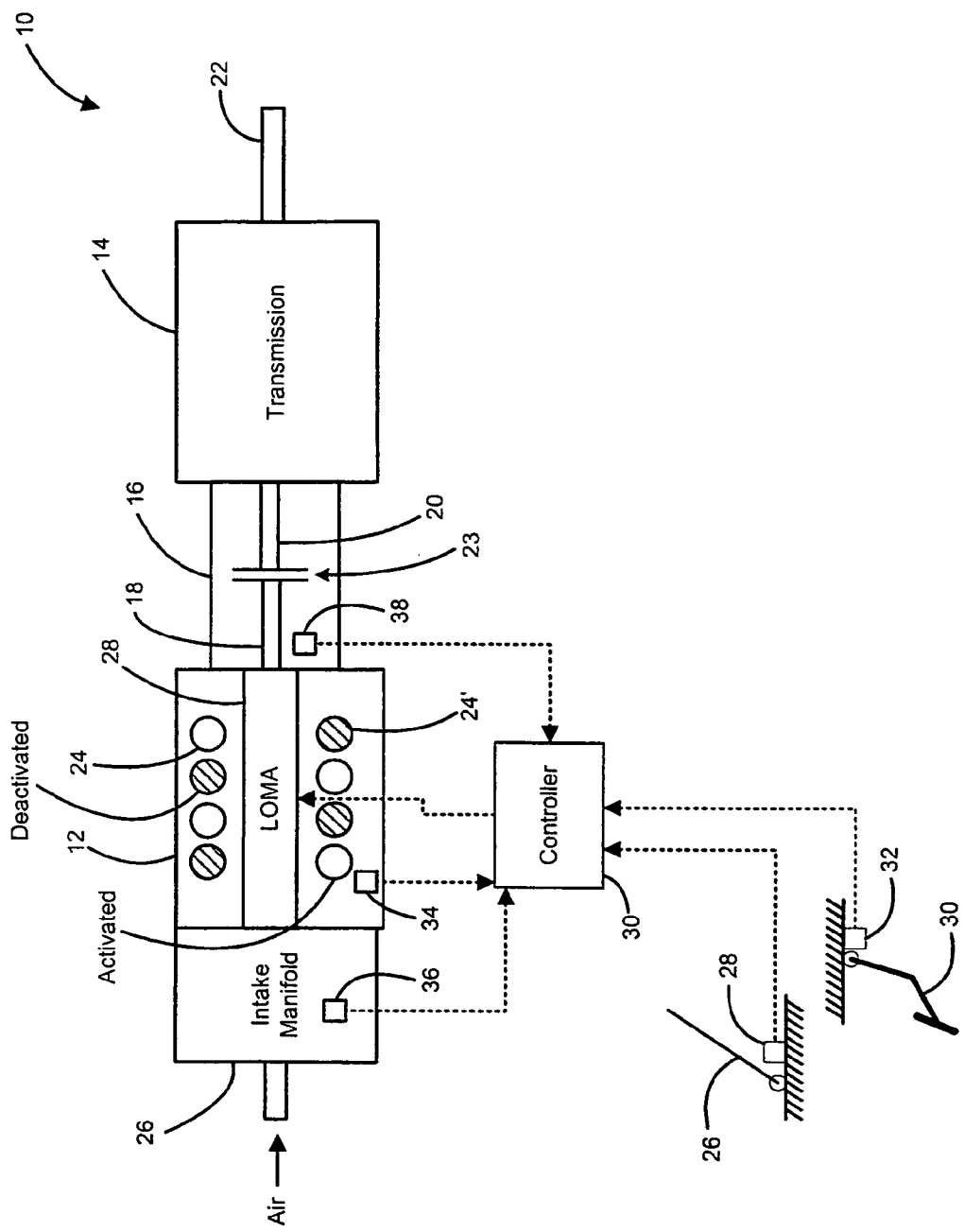
FIG. 2 is a functional block diagram illustrating an exemplary vehicle including an engine, a transmission, and a torque converter.

Referring now to FIG. 2, a vehicle 10 includes an engine 12 that drives a transmission 14. The transmission 14 is an automatic transmission and is driven by the engine 12 through a corresponding torque converter 16. More specifically, the engine 12 generates drive torque to drive a crankshaft 18. The crankshaft 18 is selectively coupled to an input shaft 20 of the transmission 14 through the torque converter 16. The transmission 14 transfers the drive torque to drive an output shaft 22 that drives a drivetrain (not shown) to propel the vehicle 10.

The torque converter 16 provides a fluid coupling that enables the engine 12 to spin somewhat independently from the transmission 14. If the engine 12 is spinning slowly (e.g., at idle), the amount of drive torque transferred through the torque converter is very small. As the engine speed increases, the amount of drive torque transferred through the torque converter 16 generally increases. Although not illustrated, the torque converter includes a pump, a turbine, and a stator. The turbine drives the input shaft 20. The stator redirects the hydraulic fluid from the turbine to the pump. Exemplary torque converters are described in further detail in commonly assigned U.S. Pat. Nos. 6,254,507 and 6,695,111, issued on Jul. 3, 2001 and Feb. 24, 2004, respectively, the disclosures of which are expressly incorporated herein by reference in their entirety.

Initially, the pump and turbine spin at different rotational speeds. Eventually, the pump and turbine rotate at a common rotational speed. A converter clutch 23 selectively locks the pump and turbine for common rotation. More specifically, the converter clutch 23 is operates in an engaged state (i.e., coupling the pump and the turbine for common rotation) and a disengaged state (i.e., decoupling the pump and the turbine from common rotation). In some cases, slippage between the pump and the turbine is regulated to provide a desired torque transfer therebetween. When regulated, relative slippage (e.g., 40 rpm) between the pump and turbine is controlled and the torque converter efficiency is improved.

The engine 12 includes N cylinders 24. One or more select cylinders 24' are selectively deactivated during engine operation. Although FIG. 2 depicts eight cylinders (N=8), it is appreciated that the engine 12 may include additional or fewer cylinders 24. For example, engines having 4, 5, 6, 8, 10, 12 and 16 cylinders are contemplated. Air flows into the engine 12 through an intake manifold 26 and is combusted with fuel in the cylinders 24. The engine also includes a lifter oil manifold assembly (LOMA) 28 that deactivates the select cylinders 24', as described in further detail below.

A controller 30 communicates with the engine 12 and various inputs and sensors as discussed herein. An engine speed sensor 34 generates an engine speed signal based on engine speed. An intake manifold absolute pressure (MAP) sensor 36 generates a MAP signal based on a pressure of the intake manifold 20. A crankshaft position sensor 38 generates a crankshaft position signal based on a crankshaft position.

When the engine 12 enters an operating point to enable a deactivated mode, the controller 30 transitions the engine 12 to the deactivated mode. In an exemplary embodiment, N/2 cylinders 24 are deactivated, although one or more cylinders may be deactivated. Upon deactivation of the select cylinders 24', the controller 30 increases the power output of the remaining or activated cylinders 24. The inlet and exhaust ports (not shown) of the deactivated cylinders 24' are closed to reduce air pumping losses. When the engine 12 is operating the deactivated mode, fewer cylinders 24 are operating which may increase the variation in rotational speed of the crankshaft 18.

Engine load is determined based on the intake MAP, cylinder mode, and engine speed. More particularly, if the MAP is below a threshold level for a given RPM, the engine load is deemed light and the engine 12 could possibly be operated in the deactivated mode. If the MAP is above the threshold level for the given RPM, the engine load is deemed heavy and the engine 12 is operated in the activated mode.

Figure 3:
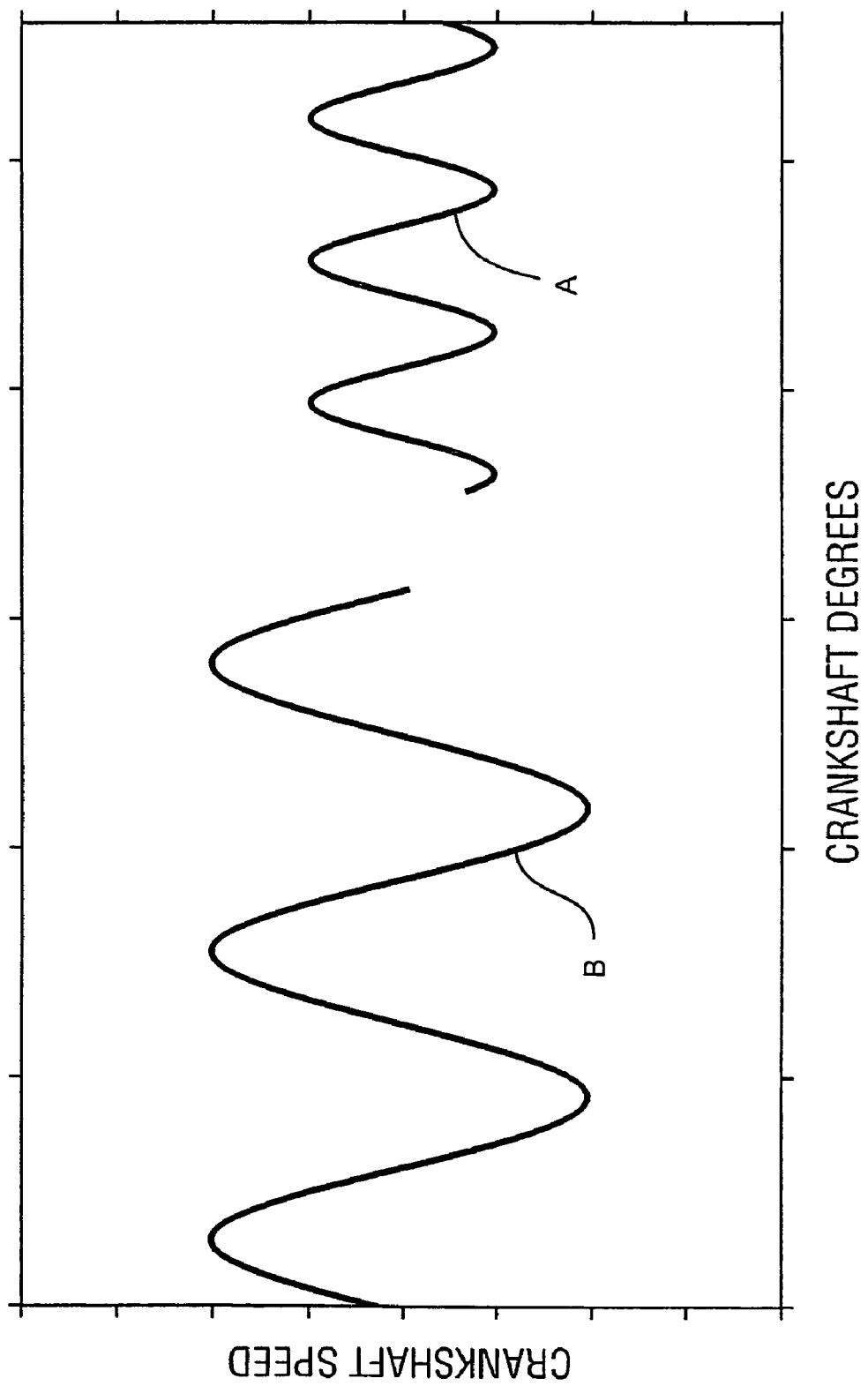
FIG. 3 is a graphical illustration of crankshaft speed versus crankshaft degrees when the engine is operating in a normal and a cylinder deactivated mode.

Referring now to FIG. 3, a graphical illustration of crankshaft speed versus crankshaft degrees is shown. Profile A illustrates crankshaft speed variations when all cylinders 24 are activated in the engine 12. Profile B illustrates crankshaft speed when the engine 12 is operating in deactivated mode. As shown, the amplitude of speed variations in the crankshaft increases when the cylinders 24 are deactivated as a result of reduced frequency of cylinder firing events. Therefore, it is desirable to minimize the speed variations when the engine 12 is operating in deactivated mode.

Figure 4:
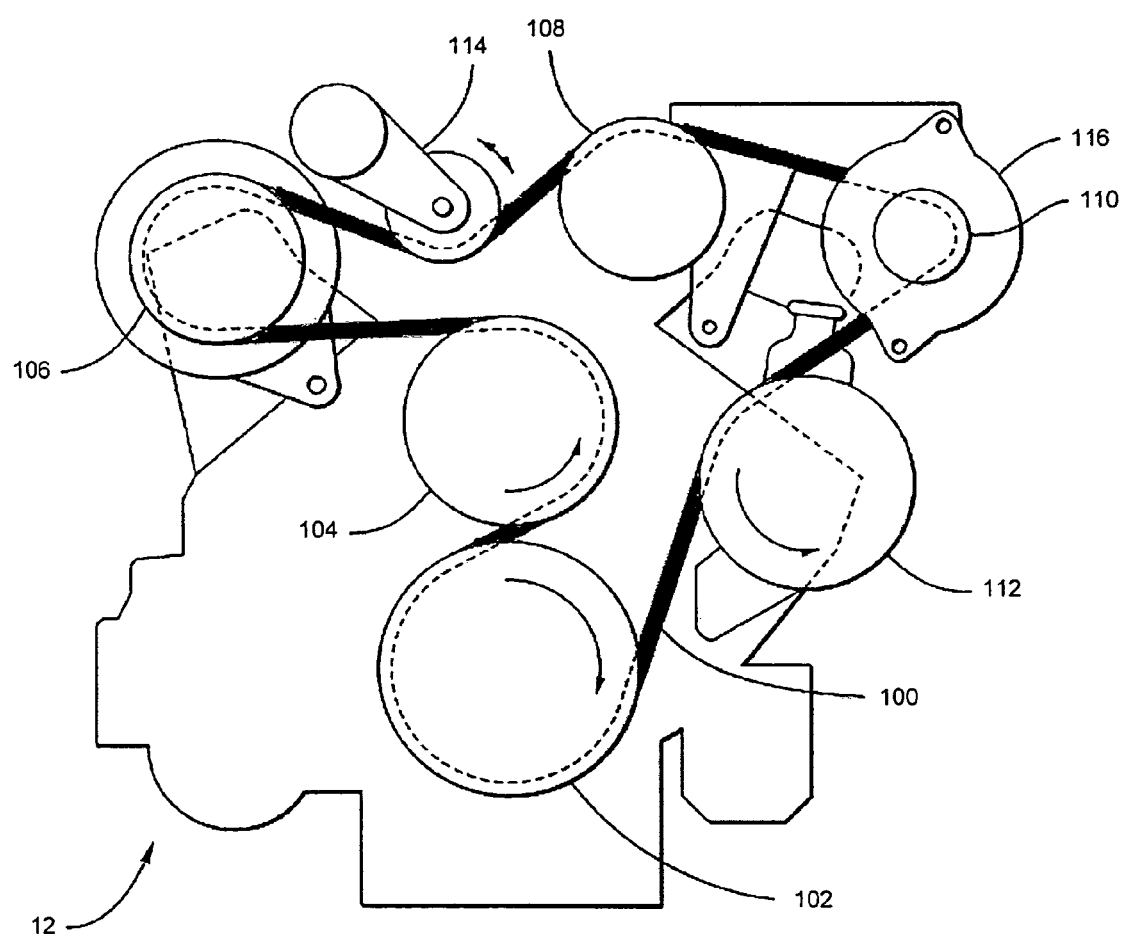
FIG. 4 is a schematic of an engine including a belt that drives vehicle accessories.

Referring now to FIG. 4, the engine 12 includes a belt 100 to drive various accessory systems. The belt 100 is driven by a crankshaft pulley 102 that is connected to the crankshaft 18. The belt drives a water pump pulley 104, an air conditioner compressor pulley 106, an air pump pulley 108, an alternator pulley 110, and a power steering pump pulley 112. A spring loaded belt tensioner 114 is provided to maintain tension in the belt 100. The alternator pulley 110 is connected to an alternator 116. Typically the alternator 116 is driven by the belt 100 and is used to generate electricity for the vehicle 10. However, the alternator 116 may be used as a braking device to selectively reduce the rotational speed of the crankshaft with a braking torque. When applying rotor current to the alternator 116, a magnetic torque is created and the torque load of the alternator pulley 110 may be manipulated. By manipulating the torque load of the alternator 116, the rotational speed variations of the crankshaft 18 may be controlled.

Figure 5:
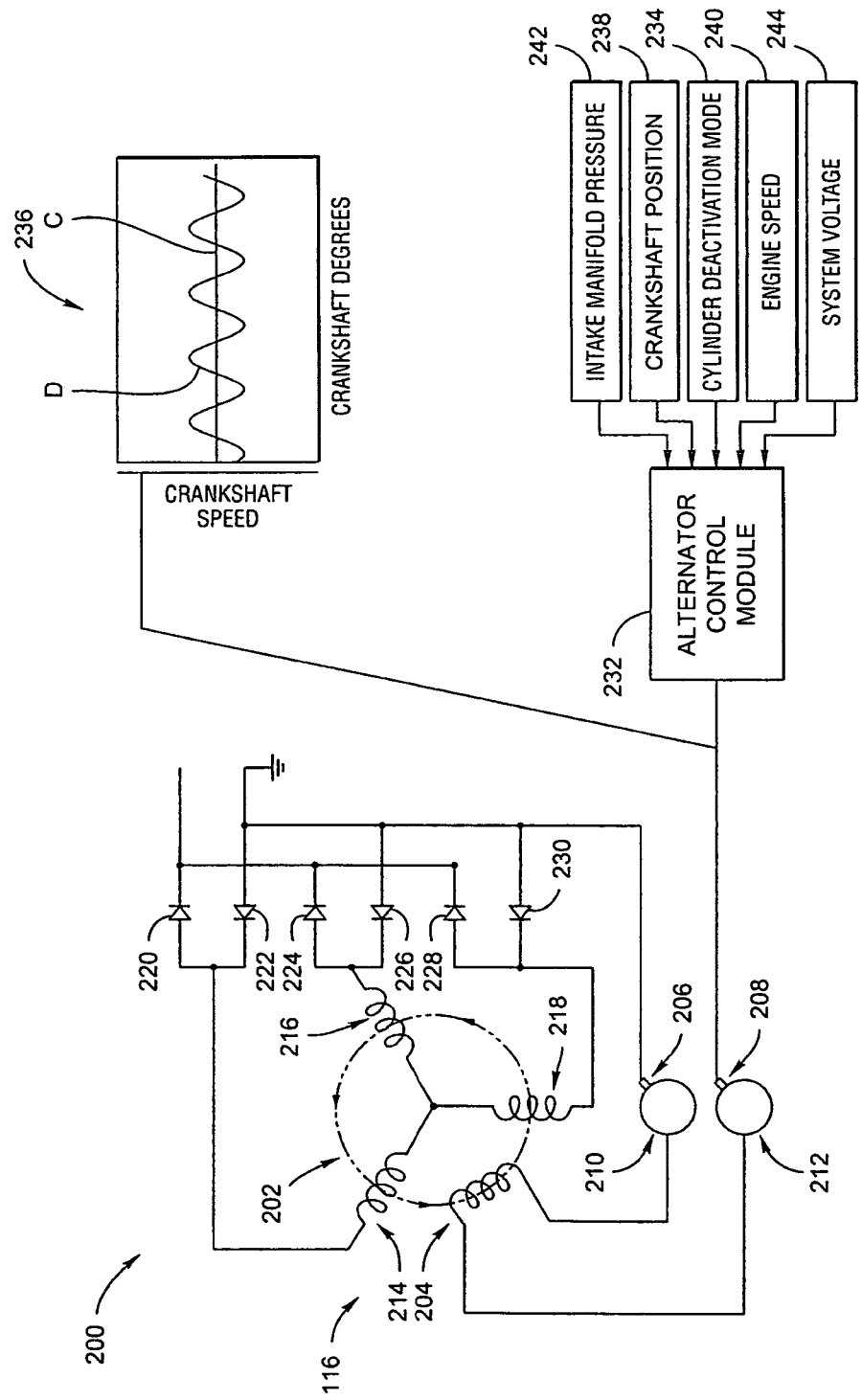
FIG. 5 is a functional block diagram illustrating a system that controls an alternator to reduce crankshaft rotational speed variations.

Referring now to FIG. 5, a system 200 is shown for reducing crankshaft speed variations. The system 200 uses the alternator 116 as an adjustable braking device to reduce variations in the rotational speed of the crankshaft 18. The alternator includes a stator 202 and a rotor 204. A voltage is applied across the rotor 204 via brushes 206, 208 and slip rings 210, 212 causing current to flow through windings of the rotor 204. When the voltage is applied to the windings of the rotor 204, the rotor 204 acts as an electromagnet.

When the rotor 204 rotates, a magnetic field induces alternating current in stationary coils of the stator 202. The alternating current from zones 214, 216, and 218 of the stator is converted to direct current with diodes 220, 222, 224, 226, 228, and 230. The direct current is used to charge a battery (not shown) and to drive electrical systems of the vehicle 10.

The system 200 includes an alternator control module 232, which may be incorporated within the controller 30. The system 200 determines whether the engine 12 is operating in the deactivated mode by reading a cylinder deactivation flag 234 that is stored in memory of the controller 30. When the engine 12 is operating in the deactivated mode, the system 200 determines a voltage profile 236 to be applied to the alternator 116. Applying the voltage profile 236 to the alternator 116 generates current in the rotor 204 to achieve a desired braking torque of the alternator 116. The voltage profile 236 may be based on a crankshaft position signal 238, an engine speed signal 240, an intake manifold pressure signal 242, and a voltage signal 244 that represents a voltage of an electrical system of the vehicle. When the engine 12 is operating in activated mode (i.e., non-cylinder deactivated mode) a flat voltage profile C is provided to the alternator 116. When the engine 12 is operating in the deactivated mode, a varying voltage profile D is provided to the alternator 116 to provide the desired braking torque to synchronize rotor torque load with crankshaft speed.

Figure 6:
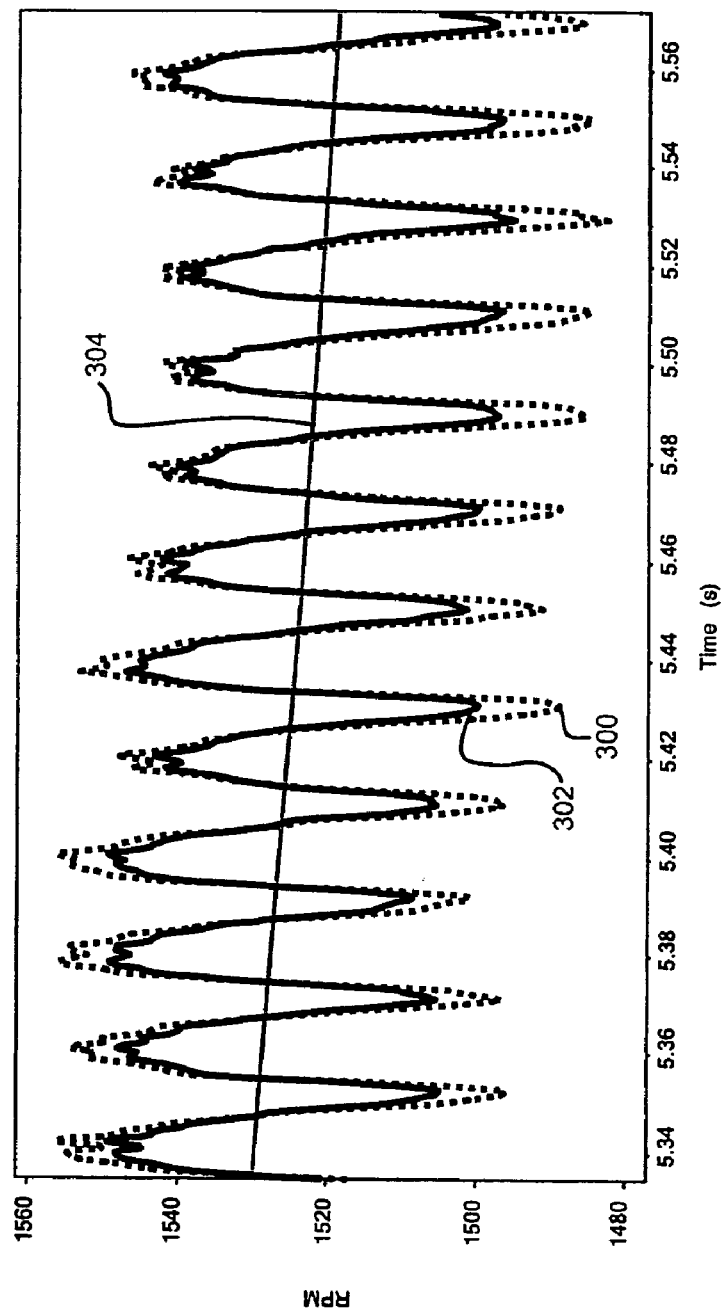
FIG. 6 is a graphical illustration of crankshaft rotational speed versus time.

Referring now to FIG. 6, a graphical representation illustrating engine revolutions per minute (RPM) versus time is shown. A dotted line 300 represents crankshaft speed variation when the vehicle 10 is operating without the system 200. A solid line 302 represents crankshaft speed variation when the vehicle is operating with the system 200. Line 304 represents the mean rotational speed of the crankshaft 18. As shown in the graph, the amplitude of variation is reduced when the vehicle 10 is operating with the system 200.

Those skilled in the art can now appreciate from the foregoing description that the broad teachings of the present invention can be implemented in a variety of forms. Therefore, while this invention has been described in connection with particular examples thereof, the true scope of the invention should not be so limited since other modifications will become apparent to the skilled practitioner upon a study of the drawings, specification, and the following claims.

What is claimed is:

1. A system to reduce rotational speed variations of a crankshaft, comprising:
    a controller that deactivates at least one cylinder in an internal combustion engine at a first time and that reactivates said at least one cylinder at a second time that is after said first time;
    a braking device that applies a braking torque to the crankshaft from said first time to said second time; and
    a control module that, between said first and second times, determines whether said controller has deactivated said at least one cylinder, increases said braking torque when a crankshaft rotational speed is increasing, and decreases said braking torque when said crankshaft rotational speed is decreasing.

2. The system of claim 1 wherein said control module determines whether said crankshaft rotational speed is one of increasing and decreasing based on a crankshaft position.

3. The system of claim 2 wherein said control module determines whether said crankshaft rotational speed is one of increasing and decreasing further based on an engine speed.

4. The system of claim 3 wherein said control module determines whether said crankshaft rotational speed is one of increasing and decreasing further based on an intake manifold pressure.

5. The system of claim 1 wherein said braking device comprises an electric machine having a rotor that communicates with the crankshaft using a belt.

6. The system of claim 5 wherein said control module selectively synchronizes a rotor torque load with said crankshaft rotational speed.

7. The system of claim 6 wherein said control module increases a current in said rotor when said crankshaft rotational speed is increasing.

8. The system of claim 7 wherein said control module decreases said current in said rotor when said crankshaft rotational speed is decreasing.

9. A method to reduce rotational speed variations of a crankshaft, comprising:
    deactivating at least one cylinder in an internal combustion engine at a first time and reactivating said at least one cylinder at a second time that is after said first time;
    applying a braking torque to the crankshaft from said first time to said second time;
    increasing said braking torque when a crankshaft rotational speed is increasing between said first and second times; and
    decreasing said braking torque when said crankshaft rotational speed is decreasing between said first and second times.

10. The method of claim 9 further comprising determining whether said crankshaft rotational speed is one of increasing and decreasing based on a crankshaft position.

11. The method of claim 10 further comprising determining whether said crankshaft rotational speed is one of increasing and decreasing further based on an engine speed.

12. The method of claim 11 further comprising determining whether said crankshaft rotational speed is one of increasing and decreasing further based on an intake manifold pressure.

13. The method of claim 9 further comprising proving an electric machine having a rotor to generate said braking torque, wherein said rotor communicates with the crankshaft using a belt.

14. The method of claim 13 further comprising selectively synchronizing a rotor torque load with said crankshaft rotational speed.

15. The method of claim 14 further comprising increasing a current in said rotor when said crankshaft rotational speed is increasing.

16. The method of claim 15 further comprising decreasing said current in said rotor when said crankshaft rotational speed is decreasing.

* * * * *